United States Patent [19]
Novak

[11] Patent Number: 4,516,647
[45] Date of Patent: May 14, 1985

[54] SOLAR POWERED VEHICLE

[76] Inventor: Thaddeus Novak, P.O. Box 487, Dearborn, Mich. 48121

[21] Appl. No.: 346,659

[22] Filed: Feb. 8, 1982

[51] Int. Cl.³ .............................................. B60L 9/00
[52] U.S. Cl. .................................... 180/2.2; 136/291; 180/65.3; 280/212
[58] Field of Search ........................ 180/2.2, 65.3, 220, 180/65.1; 280/212, 214, 215, 217, 213; 136/291, 246

[56] References Cited

U.S. PATENT DOCUMENTS

| | | | |
|---|---|---|---|
| 1,442,556 | 1/1923 | Bharucha | 280/214 |
| 3,431,994 | 3/1969 | Wood | 180/220 |
| 3,554,311 | 1/1971 | Thompson | 180/220 |
| 3,773,131 | 11/1973 | Jaulmes | 180/206 |
| 3,841,428 | 10/1974 | Bialek | 180/65 A |
| 3,884,317 | 5/1975 | Kinzel | 180/220 |
| 3,912,039 | 10/1975 | Ordemann | 180/220 |
| 3,921,745 | 11/1975 | McCulloch | 180/220 |
| 3,943,726 | 3/1976 | Miller | 180/2.2 |
| 4,062,421 | 12/1977 | Weber | 280/214 |
| 4,095,663 | 6/1978 | Gaffney | 180/220 |
| 4,296,939 | 10/1981 | Iwamota | 280/212 |

Primary Examiner—David M. Mitchell
Attorney, Agent, or Firm—Gifford, VanOphem, Sheridan, Sprinkle, & Nabozny

[57] ABSTRACT

In a bicycle having an electric motor drive including a battery power source, an apparatus for automatically recharging the battery comprising at least one photovoltaic panel secured to the wheel of the bicycle. The conductors of the photovoltaic panels are electrically connected to annular rings secured to the wheels so that a plunger supported adjacent the annular ring can transfer the charge applied to the ring to appropriate wire conductors at a junction box which applies the current to the battery and the electric motor.

9 Claims, 3 Drawing Figures

SOLAR POWERED VEHICLE

BACKGROUND OF THE INVENTION

I. Field of the Invention

The present invention relates generally to vehicles having an electrically operated load device, and more particularly, to such a device employing a photovoltaic cell for charging the electrical power source or operating the load device.

II. Description of the Prior Art

There are many previously known forms of motorized vehicles. In particular, it has also been previously known to provide a motor means for driving a bicycle in order to supplement or replace the manually driven pedal mechanism provided on such vehicles. Although such bicycles are often powered by a small internal combustion engines, it has also been known to employ electric motors powered by a battery source. Such battery powered units are substantially quieter than the internal combustion engines, and can be substantially less expensive to operate.

However, the disadvantage of battery powered propulsion units is that the battery discharges and must then be recharged or replaced. Since replacement of the battery is relatively expensive, it is preferable to recharge the battery. Quite often, the recharging unit is a stationary device which can be connected to the battery on the bicycle when the bicycle is not in use. Although some battery chargers are portable, such units are still quite bulky and, therefore, not readily transported on a vehicle such as a bicycle. Consequently, the range of travel of such a vehicle is limited. Furthermore, chargers are typically operated by plugging into a standard AC outlet, and thus, as a practical matter, are immobilized when operative. Consequently, the vehicle is unavailable for use during recharging of the battery unless the battery is removed and replaced by a fully charged battery.

SUMMARY OF THE PRESENT INVENTION

The present invention overcomes the above mentioned disadvantages by providing a solar energy conversion device carried by the vehicle. More particularly, photovoltaic cells are secured to exposed sides of wheels of the vehicle. Preferably, the cells are aligned at an angle to a plane which is normal to the axis of the wheel. Accordingly, the cells are disposed in direct contact with sunlight even during normal operation of the vehicle.

A bicycle is particularly well adapted for incorporation of the power source charging means of the present invention. In the preferred embodiment of the present invention, a plurality of photovoltaic cells are secured to the spokes of both sides of at least one of the bicycle's spoked wheels. In this manner, the photovoltaic panels are supported in the desired angular alignment. In addition, the positive and negative conductors of the photovoltaic panels can be easily wired to annular rings secured to the rim of the bicycle wheels. Moreover, the bicycle fork which supports the axle for the bicycle wheel can also be used to support electrical conductors adjacent the annular rings for the purpose of electrically connecting the photovoltaic panels with the load device. Preferably, the photovoltaic panels are connected to a battery through a voltage regulator which prevents overcharging of the battery.

Thus, the present invention provides an energy conversion device for powering a load device or recharging an electrical power source of a vehicle which can be made operable during use of the vehicle as well as when the vehicle is parked. It can be readily seen that the present invention eliminates the inconvenience of having to recharge a vehicle battery only at a location provided with a battery charging unit.

BRIEF DESCRIPTION OF THE DRAWING

The present invention will be more clearly understood by reference to the following detailed description when read in conjunction with the accompanying drawing in which like reference characters refer to like parts throughout the several views, and in which.

DETAILED DESCRIPTION OF A PREFERRED EMBODIMENT OF THE PRESENT INVENTION

Figure 1:
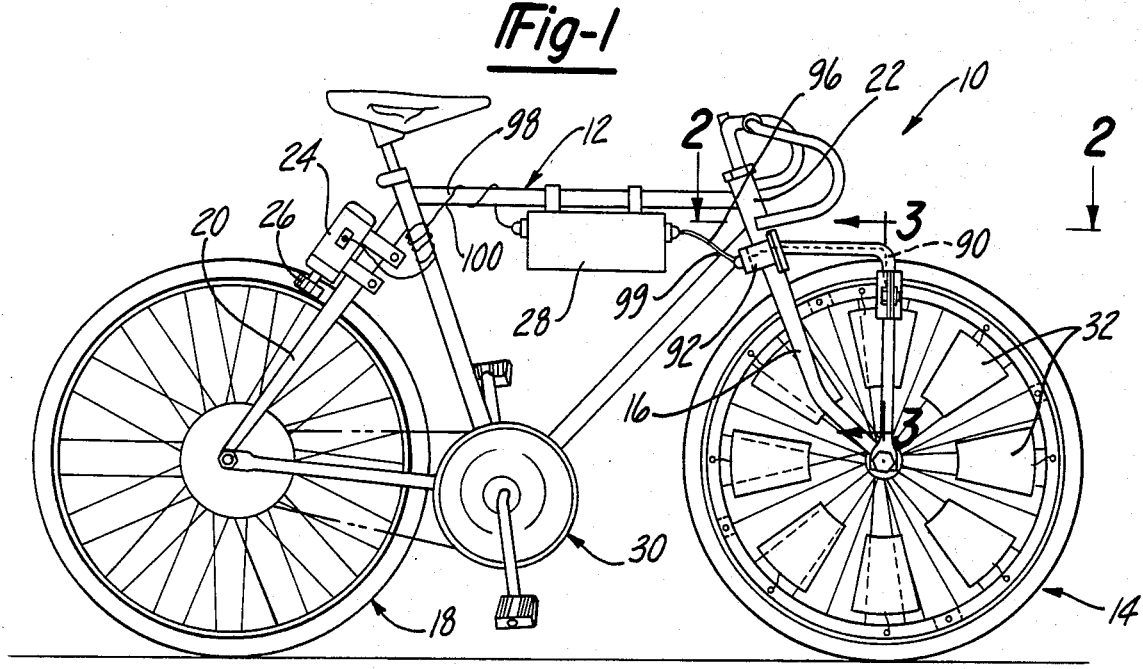
FIG. 1 is a side plane view of a bicycle constructed in accordance with the present invention to include solar energy conversion devices.

Referring first to FIG. 1, a bicycle 10 according to the present invention is thereshown comprising a frame 12, a front wheel 14 secured to the frame 12 by a front fork 16 and a rear wheel 18 secured to the frame 12 by a rear fork 20. The rear fork 20 is rigidly secured to the frame 12 while the front fork 16 is pivotally connected to the front of the frame 12 at the neck 22. An electric motor 24 is secured to the rear fork 20 by a mounting means (not shown) so that a drive wheel 26 on the motor shaft can be selectively, frictionally engaged against the tire on the rear wheel 18. Appropriate wiring electrically connects the electric motor to a battery 28 secured to the frame 12. The bicycle also includes a pedal mechanism 30 for manually driving the rear wheel 18 when the motor wheel 26 is disengaged from the tire of the wheel 18. Preferably, the hub of the wheel 18 includes a selectively engageable clutch (not shown) so that the pedal mechanism 30 can be disengaged when the drive wheel 26 is engaged with the tire of the wheel 18.

Still referring to FIG. 1, it can be seen that a plurality of photovoltaic panels 32 are circumferentially spaced around the spoke area of the wheel 14. The plurality of panels 32 cover a substantial portion of the exposed area of the wheel 14. It is to be understood that the present invention is not limited to the use of a plurality of photovoltaic panels, but could employ a single photovoltaic panel, for example, a panel in the shape of a disc which covers substantially the entire exposed side of the wheel 14. However, the use of a plurality of segment shaped panels 32 is preferred for ease of installation while still covering a substantial portion of the exposed side of the wheel.

Figure 3:
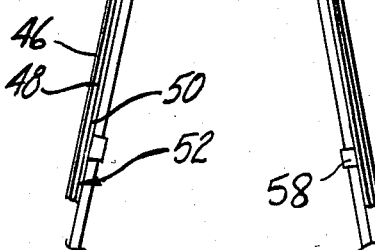
FIG. 3 is an enlarged sectional view taken substantially along the line 3—3 in FIG. 1.

Referring now to FIG. 3, it can be seen that the wheel 14 comprises a tire 40, a tire engaging rim 42 and a plurality of spokes 44 which secure the rim 42 to the hub (not shown) of the wheel 14 in a well known manner. The spokes 44 are secured at one end to the axially central portion of the rim 42 while the other ends of the spokes 44 are secured to opposite axial ends of the hub to form a tapered cage whose sides are angled with respect to a plane that is perpendicular to the axis of the wheel. Thus, it can be seen that by applying the panels 32 to the sides of the spoke formed cage, a portion of the panels 32 will be angled upwardly so as to be exposed to contact with the sunlight in a manner to be hereinafter described in detail.

As best shown in FIG. 3, each solar panel 32 comprises at least one, but preferably a plurality of, semiconductor solar cells 46 having a layer of P-type material exposed on the outside 48 of the cell while a layer of N-type material of the semiconductor is secured to the base 52. Conductors 54 and 56 permit the electric potential, which develops across the PN junction in a well known manner, to be drawn from the panel 32. Although the semiconductor solar cell shown in FIG. 3 is diagrammatically represented as a single cell, it is to be understood that the panel 32 can comprise a single panel array of many small silicon wafers to provide increased power capacity. In addition, the wafers may be enclosed in a transparent protective cover. In any event, it is only necessary in accordance with the present invention to orient the panel so that the P-type light-reactive material is exposed exteriorly of the wheel.

Base 52 of each panel 32 comprises a substantially flat plate. The rear surface of the plate is provided with pairs of projections 58 spaced slightly apart so as to lockingly engage the spokes by resiliently engaging the spoke therebetween. Although other means for securing the panel to the spokes can be used, it is to be understood that any attachment means must be sufficient to prevent sliding movement along the spokes. Accordingly, the panels are retained in position despite the centrifugal force which urges them radially outwardly toward the rim of the wheel when the wheel rotates.

Wheel 14 further includes a pair of annular ring conductors 60 and 62 adjacent the axial edges of the rim 42. As shown in FIG. 3, the annular rings 60 and 62 are supported by a support member 64 secured to the radially inner surface of the rim 42. The support member 64 includes radially inwardly extending flanges 66 and 68 which are offset from the axial ends of the support member 64 so as to form a receiving slot for each annular ring 60 and 62. Fastening rivets 70 extend through the ring 60 and flange 66 as well as the ring 62 and flange 68 to secure the rings 60 and 62 to the support member 64. The support member 64 is made of an insulating material so that the electric potential developed across the conductors 54 and 56 can be applied across the rings 60 and 62 respectively. Insulated wire conductors 72 connect the conductors 54 to the annular ring 62 while wire conductors 74 connect the conductors 56 to the annular ring 60.

Figure 2:
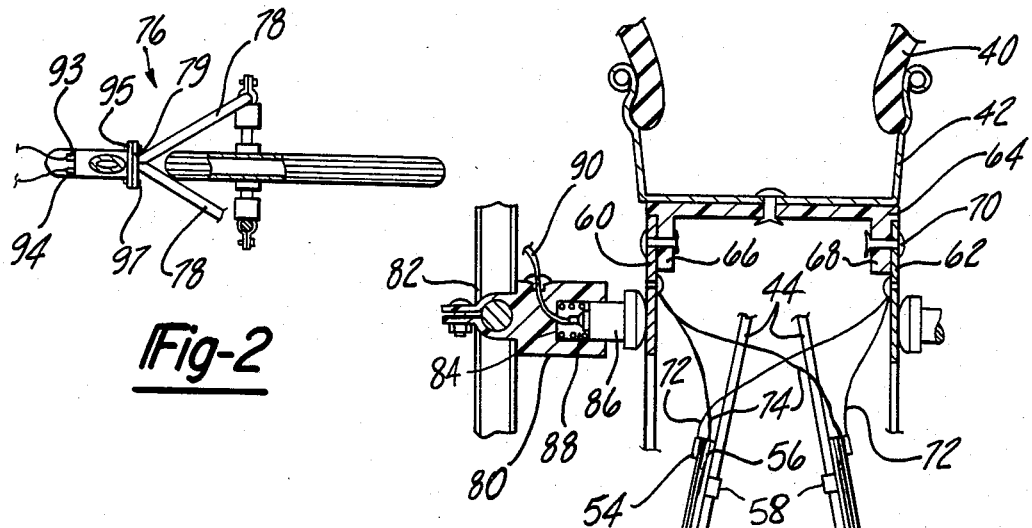
FIG. 2 is a fragmentary view taken substantially along the line 2—2 in FIG. 1.

Referring now to FIGS. 2 and 3, the bicycle also includes a current transfer mechanism for delivery of electrical current derived from the electrical potential developed across the conductors 54 and 56 to the battery 28. A pair of substantially L-shaped support bars 78 are secured to the front fork 16 at the end of a firm shank which extends forwardly from the fork 16 towards the side of the wheel 14, and a second shank depends downwardly toward and is secured at the axle of the wheel 14. The lower shank portion of the bar 78 supports a contact housing 80 adjacent the rings 60 and 62 by means of a bracket 82 secured around the bar 78. While support bars 78 have been employed so that the charging device is readily secured to any bicycle regardless of the front fork construction, it is equally within the scope of the present invention to secure the contact housing to the fork at a position adjacent the annular ring.

The housing 80 includes an open-ended bore 84 appropriate sized to slidably receive the stem of a plunger 86. A spring 88 disposed between the end wall of the bore 84 and the stem of the plunger 86 resiliently urges the plunger toward and against the respective annular ring 60 or 62. The plunger 86 is made of an electrical conducting material and is secured to a wire conductor 90. The wire conductor 90 extends from the housing 80 to a junction housing 92 supported by the fork 16 of the frame 12. In the preferred embodiment of the present invention, and as shown in FIG. 1, the support bar 78 is a hollow tube so that the conductor 90 can be inserted therethrough for protection.

A junction housing 92 includes electrical terminals for electrically wiring the positive and negative terminals of the battery 28 with the annular rings 62 and 60 respectively. In the preferred embodiment, the junction housing 92 also encloses a common form of regulator in order to prevent overcharging of the battery 28. In any event, it will be understood that insulated conductors 96 and 99 electrically connect the positive and negative terminals 92 and 94 of the junction box 92 to the positive and negative battery terminals respectively while the insulated conductors 98 and 100 electrically connect the battery terminals to the electric motor terminals.

The junction housing 92 conveniently includes a flange 95 at one end which mates with a flange 79 secured at the ends of support bars 78. The flanges are secured together by bolts 97, while one of the flanges is secured by welding or appropriate brackets to the fork 16. The flanges 79 and 95 also include apertures which permit the interior of housing 92 to communicate with the interiors of the tubular support bars 78, whereby the conductors 90 remain protected.

Having thus described the important structural features of the preferred embodiment of the present invention, the operation of the bicycle 10 in accordance with the present invention can be readily described. The solar panels 32 are exposed to the sunlight so as to cause, in a known manner, a potential difference across the conductors 54 and 56 of the solar panel. The potential difference is applied across the annular rings 62 and 60 by means of the wires 72 and 74. Each plunger 86 transfers the charge accumulated on the annular ring which it contacts to its respective conductor 90. The conductors 90 are then connected to the terminals within the junction box so as to be hooked substantially in parallel with the terminals of the battery 28 at the terminal board in the junction box 92. Accordingly, it will be understood that current generated by the potential developed by the solar cells serves to recharge the battery 28 and assist it in powering the motor 24.

It can be seen that this recharging function can occur while the bicycle is being ridden as well as when the bicycle is parked. Thus, the present invention avoids the need for immobilizing the bicycle for recharging of the battery by previously known battery chargers. Furthermore, unlike previously known wheel driven generators for recharging a battery, the bicycle need not be in motion to generate an electrical current for recharging the battery 28 or driving the motor 24. Thus, it can be seen that the generator in accordance with the present invention will be operative automatically when the bike is ridden or parked in daylight. In addition, the generator can be made operative on cloudy days or at night by directing incandescent, florescent or other light sources against the solar panels 32. Accordingly, the range of the vehicle in its electric motor operated mode is substantially unlimited but for deterioration of the battery or motor parts. In addition, the need for specialized equipment for recharging the battery is eliminated.

Having thus described my invention, many modifications thereto will become apparent to those skilled in the art to which it pertains without departing from the scope and spirit of the present invention as defined in the appended claims. For example, skilled artisans will readily understand that the power conversion will also be useful for powering lights, horns or other electrically operated devices of motor vehicles.

What is claimed is:

1. A vehicle comprising:
   a frame,
   a wheel rotatably mounted to said frame,
   an electrical load secured to said frame,
   means for converting solar energy to electrical energy secured to said wheel, and
   means for electrically connecting said converting means to said load despite rotation of said wheel.

2. The invention as defined in claim 1 wherein said converting means comprises at least one photovoltaic panel.

3. The invention as defined in claim 2 wherein said photovoltaic panel includes first and second conductors, and wherein said connecting means comprises
   an annular rim secured to said wheel, said annular rim having a first electrically conducting annular portion and a second electrically conducting annular portion,
   means for electrically insulating said first portion from said second portion; and
   second means for electrically connecting said first and second conductors to said first and second portions, respectively.

4. The invention as defined in claim 3 wherein said second electrical connecting means means comprises a plunger, means for supporting said plunger adjacent said rim, and resilient means for urging said plunger against said rim.

5. The invention as defined in claim 2 wherein said panel is secured to said wheel at an angle with respect to a vertical plane perpendicular to the axis of said wheel.

6. The invention as defined in claim 2 wherein said wheel comprises a wheel having spokes, and wherein said panel is secured to said spokes.

7. The invention as defined in claim 1 wherein said vehicle comprises a bicycle.

8. The invention as defined in claim 1 wherein said converting means comprises a plurality of photovoltaic panels circumferentially spaced around said wheel.

9. The invention as defined in claim 1 wherein said electric load comprises an electric motor means for driving said vehicle.

* * * * *

UNITED STATES PATENT AND TRADEMARK OFFICE
CERTIFICATE OF CORRECTION

PATENT NO. : 4,516,647
DATED : May 14, 1985
INVENTOR(S) : Thaddeus Novak

It is certified that error appears in the above-identified patent and that said Letters Patent is hereby corrected as shown below:

In the Abstract, line 1 after "drive" insert --means--.

Column 4, line 2 delete "appropriate" insert --appropriately--.

Column 4, line 22 delete "92" insert --93--.

Claim 4, line 9, column 6 delete "means" (second occurrence).

Signed and Sealed this

Fifteenth Day of October 1985

[SEAL]

Attest:

Attesting Officer

DONALD J. QUIGG

Commissioner of Patents and Trademarks—Designate